US011318933B2

(12) United States Patent
Park et al.

(10) Patent No.: US 11,318,933 B2
(45) Date of Patent: May 3, 2022

(54) VEHICLE AND METHOD FOR CONTROLLING THEREOF

(71) Applicants:Hyundai Motor Company, Seoul (KR); Kia Motors Corporation, Seoul (KR)

(72) Inventors: Hong Gi Park, Seoul (KR); Seunghyun Kim, Seoul (KR); Ilhwan Kim, Hwaseong-si (KR); Donghyuk Kim, Hwaseong-si (KR); Kyung-joo Bang, Seoul (KR)

(73) Assignees: Hyundai Motor Gompany, Seoul (KR); Kia Motors Gorporation, Seoul (KR)

( * ) Notice: Subject to any disclaimer, the term of this patent is extended or adjusted under 35 U.S.C. 154(b) by 208 days.

(21) Appl. No.: 16/667,705

(22) Filed: Oct. 29, 2019

(65) Prior Publication Data
US 2020/0361453 A1  Nov. 19, 2020

(30) Foreign Application Priority Data

May 14, 2019 (KR) ......................... 10-2019-0056487

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/20* (2013.01); *B60W 40/08* (2013.01);
(Continued)

(58) Field of Classification Search
CPC ............ B60W 30/0956; B60W 50/14; B60W 2554/00; B60W 2556/45; B60W 30/09; B60W 10/04; B60W 10/20; B60W 40/08; B60W 2050/146; B60W 2520/10; B60W 2540/26; B60W 2710/20; B60W 2720/10;
(Continued)

(56) References Cited

U.S. PATENT DOCUMENTS

2012/0268260 A1\* 10/2012 Miller ................... G08G 1/166
340/435
2015/0206434 A1\* 7/2015 Shimotani .............. G08G 1/167
701/1

(Continued)

FOREIGN PATENT DOCUMENTS

DE 102016225399 A1 \* 6/2018 ........... G08G 1/0962

*Primary Examiner* — Peter D Nolan
*Assistant Examiner* — Ellis Bernardo Ramirez
(74) *Attorney, Agent, or Firm* — Morgan, Lewis & Bockius LLP

(57) ABSTRACT

A vehicle may include a communicator configured to receive driver state information from a surrounding vehicle, a detector configured to obtain driving information related to surrounding vehicle, a driving assistance module configured to control at least one of a driving speed or a driving direction and a controller configured to determine whether a driver of the surrounding vehicle is in drowsiness state based on whether the received driver state information satisfies a predetermined condition and if the driver of the surrounding vehicle is determined as drowsiness state, control the driving assistance module to avoid the surrounding vehicle.

18 Claims, 5 Drawing Sheets

(51) Int. Cl.
  *B60W 10/20* (2006.01)
  *B60W 40/08* (2012.01)
  *B60W 50/14* (2020.01)

(52) U.S. Cl.
  CPC ..... *B60W 50/14* (2013.01); *B60W 2040/0827* (2013.01); *B60W 2050/143* (2013.01); *B60W 2050/146* (2013.01); *B60W 2520/10* (2013.01); *B60W 2540/26* (2013.01); *B60W 2710/20* (2013.01); *B60W 2720/10* (2013.01)

(58) Field of Classification Search
  CPC ... B60W 2050/143; B60W 2040/0827; B60W 30/18163; B60W 2754/30; B60W 2554/4047; B60W 2556/65; B60W 2554/802; B60W 2554/803; B60W 2554/804; B60W 60/0015; B60W 40/105; G08G 1/162; G08G 1/163; G08G 1/166; G08G 1/0962

USPC ........ 701/41, 48, 60, 65; 340/465, 466, 467; 342/69, 71
  See application file for complete search history.

(56) References Cited

U.S. PATENT DOCUMENTS

| | | | | |
|---|---|---|---|---|
| 2015/0298621 | A1* | 10/2015 | Katoh | G08G 1/165 |
| | | | | 348/148 |
| 2017/0325732 | A1* | 11/2017 | Kodama | B60Q 1/525 |
| 2018/0144636 | A1* | 5/2018 | Becker | B60W 30/0956 |
| 2018/0194365 | A1* | 7/2018 | Bae | B60W 10/18 |
| 2019/0049965 | A1* | 2/2019 | Tanriover | G08G 1/01 |
| 2019/0392235 | A1* | 12/2019 | Shimizu | B60W 40/08 |
| 2020/0079382 | A1* | 3/2020 | Boulton | B60W 40/04 |
| 2020/0339131 | A1* | 10/2020 | Olsson | B60K 28/066 |

* cited by examiner

VEHICLE AND METHOD FOR CONTROLLING THEREOF

CROSS-REFERENCE TO RELATED APPLICATION(S)

The present application claims priority to Korean Patent Application No 10-2019-0056487, filed on May 14, 2019, the entire contents of which is incorporated herein for all purposes by this reference.

BACKGROUND OF THE INVENTION

Field of the Invention

The present invention relates to a vehicle and a control method thereof performs communication with surrounding vehicles to provide convenience for driving of a driver.

Description of Related Art

Recently, to reduce the burden on the driver and to increase the convenience, research on vehicles provided with an Advanced Driver Assist System (ADAS), which actively provides information on vehicle status, driver status, and surrounding environment, is being actively conducted.

Examples of advanced driver assistance systems in vehicles include the Smart Cruise Control System, Lane Keeping Assist System, Lane Following Assist and Lane Departure Warning System, Forward Collision Avoidance (FCA), and Autonomous Emergency Brake (AEB). A driver state warning system for monitoring a driver's forward neglect or drowsiness is also an example.

Meanwhile, in addition to the driver's condition, the driver's condition of the surrounding vehicle may also have a significant influence on the driving environment, since the driver's condition of the surrounding vehicle is an important factor for determining the driving condition of the surrounding vehicle. Accordingly, there is a demand for a driver assistance system configured for actively providing a driving strategy according to a driver's state of a surrounding vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a control method thereof configured for communicating with surrounding vehicles.

In accordance with an aspect of the present invention, a vehicle includes a communicator configured to receive driver state information from a surrounding vehicle; a detector configured to obtain driving information related to the surrounding vehicle; a driving assistance module configured to control at least one of a driving speed or a driving direction of the vehicle; and a controller configured to determine whether a driver of the surrounding vehicle is in drowsiness state based on whether the received driver state information satisfies a predetermined condition and if the driver of the surrounding vehicle is determined as drowsiness state, control the driving assistance module to avoid the surrounding vehicle.

The controller may be configured to determine that the driver of the surrounding vehicle is in drowsiness state when the driver state information is continuously received for more than a predetermined time or received for more than a predetermined number of times for a predetermined unit time.

The controller may be configured to determine whether the surrounding vehicle is deflected based on the driving information related to the surrounding vehicle when the driver of the surrounding vehicle is determined to be in the drowsiness state, and may control the driving assistance module to avoid the surrounding vehicle based on a deflection of the surrounding vehicle.

The controller may be configured to determine the deflection of the surrounding vehicle based on at least one of the speed information related to the vehicle, the speed information, distance information, lane information related to the surrounding vehicle included in the driving information related to the surrounding vehicle.

The controller may be configured to control the driving assistance module such that the driving direction is opposite to the deflection direction of the surrounding vehicle when the surrounding vehicle is determined to be deflected.

The vehicle further includes a display and a speaker and the controller may be configured to control the display or the speaker to inform a user of the deflection direction of the surrounding vehicle.

The controller may be configured to control the driving assistance module such that the driving direction is opposite to the deflection direction of the surrounding vehicle when a control command related to driving of the vehicle is not received from the user for a predetermined first reference time from the time when the user is informed of the deflection direction of the surrounding vehicle.

The controller may be configured to control the driving assistance module such that a distance from the surrounding vehicle to the vehicle becomes a predetermined maximum value when a driving lane of the vehicle is not changed for a predetermined second reference time from the time when the user is informed of the deflection direction of the surrounding vehicle.

The controller may be configured to control the driving assistance module such that a distance from the surrounding vehicle to the vehicle becomes a predetermined maximum value based on the position of the surrounding vehicle when the surrounding vehicle is determined as being not deflected.

The controller may be configured to control the driving assistance module to change a driving lane of the vehicle or may request a user to change the driving lane when the surrounding vehicle is a following vehicle and driving information related to the following vehicle satisfies a predetermined condition.

The controller may be configured to control the driving assistance module such that the distance from the surrounding vehicle becomes the predetermined maximum value when the driving lane is not changed for a predetermined third reference time from the time requested to change the driving lane.

The vehicle further includes a display and a speaker, and the controller may be configured to control the display or the speaker to output alarm when the driver of the surrounding vehicle is determined to be in the drowsiness state.

The controller may be configured to control the driving assistance module to avoid a following vehicle when a driver of a preceding vehicle and a driver of a following vehicle are determined to be in the drowsiness state.

In accordance with an aspect of the present invention, a method for controlling a vehicle includes receiving driver state information from a surrounding vehicle; obtaining driving information related to the surrounding vehicle; determining whether a driver of the surrounding vehicle is in a drowsiness state based on whether the received driver state information satisfies a predetermined condition; and controlling at least one of driving speed and driving direction of the vehicle to avoid the surrounding vehicle when the driver of the surrounding vehicle is determined as drowsiness state.

Controlling at least one of driving speed and driving direction of the vehicle to avoid the surrounding vehicle may include determining whether the surrounding vehicle is deflected based on the driving information related to the surrounding vehicle when the driver of the surrounding vehicle is determined to be in the drowsiness state, and controlling at least one of driving speed and driving direction of the vehicle to avoid the surrounding vehicle based on a deflection of the surrounding vehicle.

Controlling at least one of driving speed and driving direction of the vehicle to avoid the surrounding vehicle may include controlling the driving direction such that the driving direction is opposite to the deflection direction of the surrounding vehicle when the surrounding vehicle is determined to be deflected.

Controlling at least one of driving speed and driving direction of the vehicle to avoid the surrounding vehicle may include informing the deflection direction of the surrounding vehicle; and controlling the driving direction such that the driving direction is opposite to the deflection direction of the surrounding vehicle when a control command related to driving of the vehicle is not received from the user for a predetermined first reference time from the time when the user is informed of the deflection direction of the surrounding vehicle.

Controlling at least one of driving speed and driving direction of the vehicle to avoid the surrounding vehicle may include controlling the driving assistance module such that a distance from the surrounding vehicle to the vehicle becomes a predetermined maximum value when a driving lane of the vehicle is not changed for a predetermined second reference time from the time when the user is informed of the deflection direction of the surrounding vehicle.

Controlling at least one of driving speed and driving direction of the vehicle to avoid the surrounding vehicle may include controlling the driving speed such that a distance from the surrounding vehicle to the vehicle becomes a predetermined maximum value based on the position of the surrounding vehicle when the surrounding vehicle is determined as being not deflected.

In accordance with an aspect of the present invention, combining with a computing device, processing a computing program stored in a record medium, the steps includes: receiving driver state information from a surrounding vehicle; obtaining driving information related to the surrounding vehicle; determining whether a driver of the surrounding vehicle is in a drowsiness state based on whether the received driver state information satisfies a predetermined condition; and controlling at least one of driving speed and driving direction of the vehicle to avoid the surrounding vehicle when the driver of the surrounding vehicle is determined as drowsiness state.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
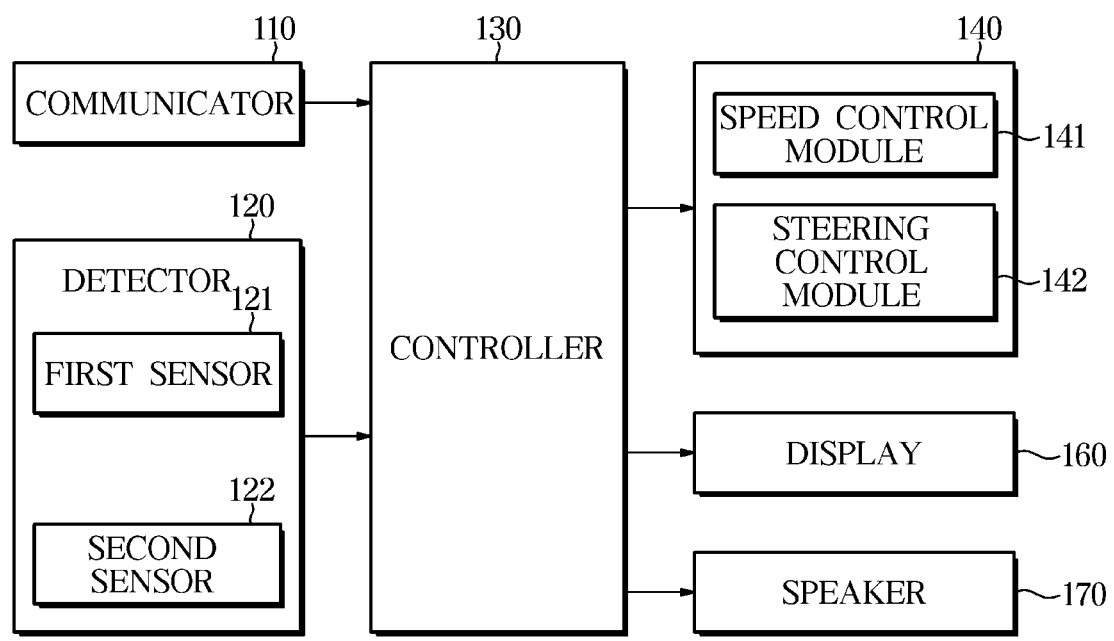
FIG. 1 is a controlling block diagram of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, like reference numerals refer to like elements throughout the specification. This specification does not describe all elements of the embodiments, and in the Field of the Invention to which an exemplary embodiment of the present invention pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present invention will be described with reference to the accompanying drawings.

Figure 2:
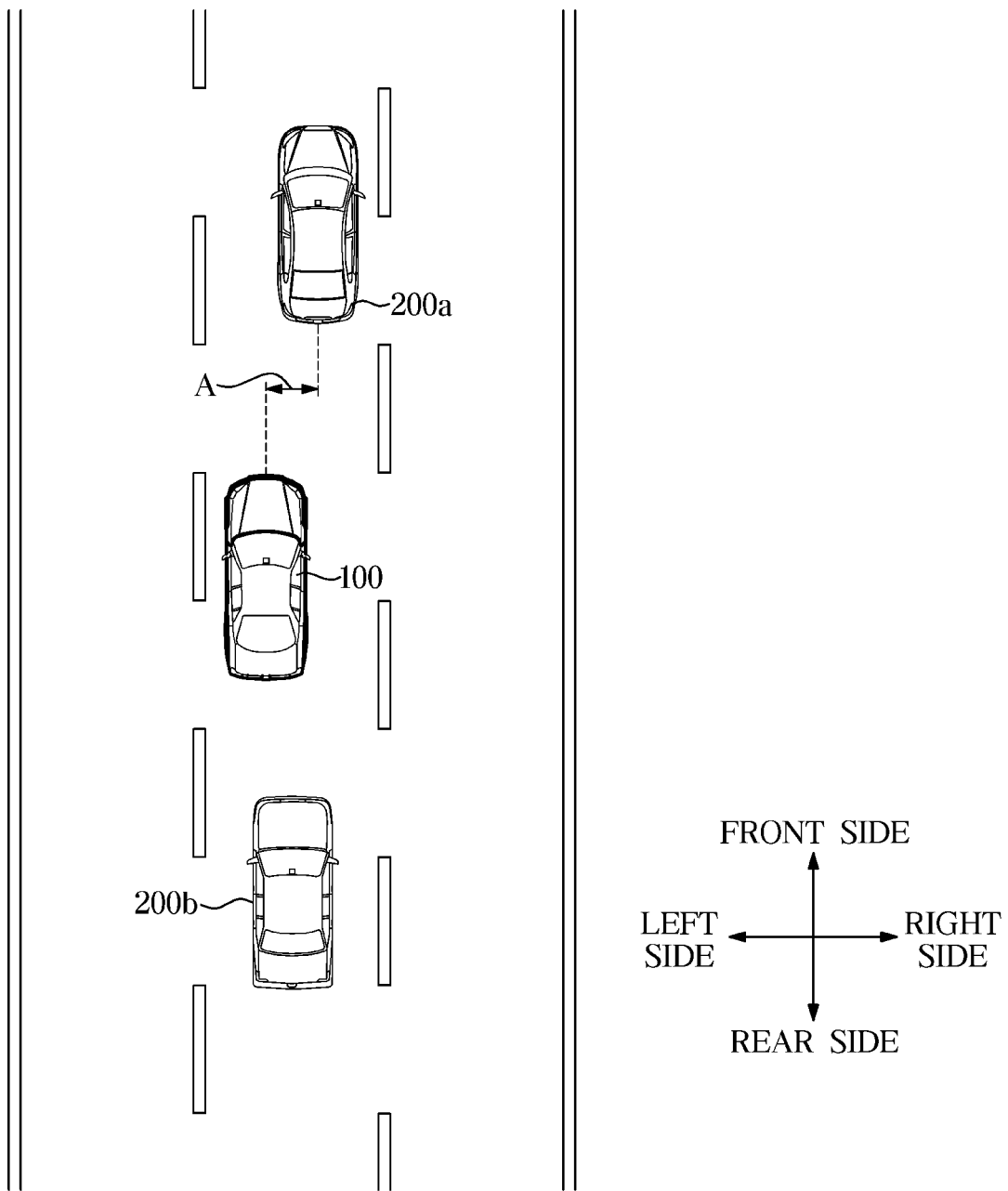
FIG. 2 is an example of a road on which a vehicle runs according to an exemplary embodiment of the present invention.

FIG. 1 is a controlling block diagram of a driving system according to an exemplary embodiment of the present invention, and FIG. 2 is an example of a road on which a vehicle runs according to an exemplary embodiment of the present invention.

Referring to FIG. 1 and FIG. 2, vehicle 100 according to an exemplary embodiment of the present invention may include a communicator 110, a detector 120, a controller 130, a driving assistance module 140, a display 160 and a speaker 170.

The communicator 110 may receive driver state information from a surrounding vehicles located near the vehicle 100.

The driver state information is information indicating a drowsiness state of the driver and may mean a signal output from a driver state warning system (DSW).

For example, the driver state information may include a driver drowsiness detection signal. To the present end, the surrounding vehicle may be a vehicle provided with a driver state warning system (DSW), and may include a communication module for transmitting driver state information to the vehicle 100.

The communication module included in the communicator 110 and the surrounding vehicle may perform vehicle-to-vehicle (V2V) communication in real time, and may include one or more components that enable communication with external devices such as the surrounding vehicle.

For example, the communicator 110 may include at least one of a short range communication module and a wireless communication module.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wireless communication module may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), 4G and 5G.

The wireless communication module may include a wireless communication interface including an antenna for transmitting a driver state information signal and a transmitter. The wireless communication module may further include a signal conversion module configured to modulate the digital control signal output from the control unit to an analog type wireless signal through the wireless communication interface under the control of the controller The wireless communication module may include a wireless communication interface including an antenna and a receiver for receiving a driver state information signal. The wireless communication module may further include a signal conversion module for demodulating the analog signal received through the wireless communication interface into a digital control signal.

Meanwhile, the communicator 110 may transmit a signal between various components inside the vehicle 100, and for the present purpose, may include a wired communication module.

The wired communication module may be a variety of wired devices such as a controller area network (CAN) module, a local area network (LAN) module, a wide area network (WAN) module, or a value added network (VAN) module. In addition to communication modules, it may include various cable communication modules such as universal serial bus (USB), high definition multimedia interface (HDMI), digital visual interface (DVI), RS-232 (recommended standard 232), power line communication, or plain old telephone service (POTS).

The detector 120 may acquire driving information related to the vehicle 100 and surrounding vehicles. This may include a first sensor 121 disposed to have a sensing field of view of the front of the vehicle 100 and a second sensor 122 disposed to have a sensing field of view of the rear of the vehicle 200.

The detector 120 may acquire various driving information related to a surrounding vehicle including at least one of a preceding vehicle and a following vehicle as well as driving information related to the vehicle 100. The driving information obtained by the detector 120 may include speed and acceleration of surrounding vehicles, speed information including relative speed and relative acceleration with respect to vehicle 100, distance information between the vehicle 100 and surrounding vehicles, and information related to lanes driving by surrounding vehicles.

Referring to FIG. 2, the first sensor 121 may obtain information related to the behavior of the preceding vehicle 200a positioned in front of the vehicle 100. It is possible to obtain not only information such as relative speed, relative acceleration and relative distance in the longitudinal direction of the preceding vehicle 200a but also information such as the relative speed, relative acceleration, lateral distance A, lane information, lane offset in the lateral direction, and the like.

The second sensor 122 may obtain information related to the behavior of the following vehicle 200b positioned behind of the vehicle 100. It is possible to obtain not only information such as relative speed, relative acceleration and relative distance in the longitudinal direction of the following vehicle 200b but also information such as the relative speed, relative acceleration, lateral distance A, lane information, lane offset in the lateral direction, and the like.

The driving information related to the surrounding vehicle may be obtained through image data or radar data. For the present purpose, the detector 120 may be implemented as a camera sensor or a radar sensor. Furthermore, it may be implemented with various sensors.

Meanwhile, in FIG. 2, both the preceding vehicle 200a and the following vehicle 200b are driven in the same lane as the vehicle 100. In contrast, the preceding vehicle 200a may be a vehicle located in the front side of the vehicle 100, and the following vehicle 200b may be a vehicle located in the rear side of the vehicle 100.

The driving assistance module 140 may provide various functions for driving assistance to the user of the vehicle 100. The driving assistance module 140 may include a speed control module 141 for controlling the driving speed and a steering control module 142 for controlling the driving direction thereof.

The speed control module 141 may include various devices for driving an accelerator or a brake, and may be a smart cruise control (SCC) module.

The steering control module 142 may include various devices for adjusting the driving direction of the vehicle 100 from side to side, and may be a current lane keeping assistance (LKA) module.

Furthermore, the driving assistance module 140 includes at least one device configured for providing various driving assistance functions such as Lane Departure Warning (LDW), Lane Keeping Assist (LKA), High Beam Assist (HBA), and Autonomous Emergency Braking (AEB), Traffic Sign Recognition (TSR), and Blind Spot Detection (BSD).

The display 160 may visually provide various information related to the vehicle 100 or surrounding vehicles to the user. The display 160 may be implemented using a navigation device which is commonly used.

Meanwhile, the display 160 includes a cathode ray tube (CRT), a digital light processing (DLP) panel, a plasma display penal, a liquid crystal display (LCD) panel, an electric Electro Luminescence (EL) Panels, Electrophoretic Display (EPD) Panels, Electrochromic Display (ECD) Panels, Light Emitting Diode (LED) Panels, or Organic Light Emitting Diodes: OLED) panel, etc., but is not limited thereto.

The speaker 170 may provide a variety of information related to the vehicle 100 or surrounding vehicles to the user. The speaker 170 may be mounted inside the vehicle 100 to provide information to a user inside the vehicle 100. However, the present invention is not limited thereto and may be mounted outside the vehicle 100.

The controller 130 may control various components of the interior of the vehicle 100 as a whole.

The controller 130 may determine whether the driver of the surrounding vehicle is in a drowsiness state based on whether the driver state information received by the communicator 110 satisfies a predetermined condition. The driving assistance module 140 may be controlled to avoid the surrounding vehicle when the driver of the surrounding vehicle is determined to be in the drowsiness state.

In detail, when the driver state information is continuously received for more than a predetermined time or received for more than a predetermined number of times for a predetermined unit time, then the controller 130 may determine the driver of the surrounding vehicle is in drowsiness state.

For example, when the driver state information is the driver's drowsiness detection signal, the controller 130 may determine that the driver's drowsiness detection signal is continuously received for two seconds or more or two or more times the driver's drowsiness detection signal is received two times or more for 10 seconds. Accordingly, the controller 130 may determine that the driver is in the drowsiness state.

Furthermore, when it is determined that the driver of the surrounding vehicle is in the drowsiness state, the controller 130 may control the driving assistance module 140 to avoid the surrounding vehicle based on whether the surrounding vehicle is a preceding vehicle or a following vehicle.

In the instant case, the driving assistance module 140 may be controlled differently as the controller 130 operates in the following vehicle avoidance mode if the driver of the surrounding vehicle determined in the drowsiness state is the driver of the following vehicle, and operates in the preceding vehicle avoidance mode if the driver of the surrounding vehicle determined in the drowsiness state is the driver of the preceding vehicle.

A detailed description of the following vehicle avoidance mode and the preceding vehicle avoidance mode will be described later.

Furthermore, when it is determined that both a driver of a preceding vehicle and a driver of a following vehicle are in the drowsiness state, the controller 130 may control the driving assistance module 140 to preferentially avoid the following vehicle. In detail, the controller 130 may activate the following vehicle avoidance mode before the preceding vehicle avoidance mode.

When it is determined that the driver of the surrounding vehicle is in the drowsiness state, the controller 130 may control the display 160 or the speaker 170 to provide a warning to the user of the vehicle 100.

Furthermore, when it is determined that the driver of the surrounding vehicle is in the drowsiness state, the controller 130 determines whether the surrounding vehicle is deflected based on the driving information related to the surrounding vehicle, and the controller 130 determines the driving assistance to avoid the surrounding vehicle based on a deflection of the surrounding vehicle.

In detail, the controller 130 may determine whether the surrounding vehicle is deflected based on at least one of the speed information related to the vehicle, the speed information related to the surrounding vehicle, the distance information, or the lane information included in the driving information related to the surrounding vehicle.

In the instant case, the controller 130 may determine that the surrounding vehicle is deflected when at least one of the speed information related to the vehicle, the speed information related to the surrounding vehicle, the distance information, or the lane information included in the driving information related to the surrounding vehicle satisfies the predetermined deflection condition.

The predetermined deflection condition further combines and then determines at least one of speed information or lane information related to the vehicle 100 as well as at least one of speed information related to the vehicle, speed information, distance information, or lane information related to the vehicle included in the driving information related to the surrounding vehicle.

In the instant case, the predetermined deflection condition may be different from the case where the surrounding vehicle is the preceding vehicle and the case where the following vehicle is the following vehicle, but may be the same.

For example, the controller 130 may determine the surrounding vehicle is deflected if the vehicle has a speed of 60 kph or more, a longitudinal distance between the surrounding vehicle and the vehicle 100 within 50 m, a lateral distance between the surrounding vehicle and the vehicle 100 is 1 m or more, the lateral speed of the surrounding vehicle is 0.3 m/s or more relative to the lateral speed of the vehicle 100 and the vehicle 100 normally follows the lane.

When it is determined that the surrounding vehicle is deflected, the controller 130 may control the steering control module 142 such that the driving direction of the vehicle 100 is opposite to the deflection direction of the surrounding vehicle.

In the instant case, the controller 130 may visually or acoustically notify the user of the deflection direction of the surrounding vehicle, and the user may directly adjust the steering based on the deflection direction of the surrounding vehicle. When the user inputs a control command related to driving of the vehicle such as directly changing the driving direction or reducing the speed through the steering wheel or the like, the controller 130 may not control the steering control module 142.

However, when the user does not directly adjust the steering despite the notice of the deflection direction of the surrounding vehicle, the controller 130 may control the steering control module 142 to adjust the steering direction.

In the instant case, when the controller 130 does not receive a control command related to driving of the vehicle from the user for a predetermined first reference time from the time when the user is notified of the deflection direction of the surrounding vehicle, the controller 130 may control the steering control module 142 to move in a direction opposite to the deflection direction of the surrounding vehicle. The user may order a control command related to driving of the vehicle through an operation such as manipulating a steering wheel or pressing a brake pedal.

Furthermore, the controller 130 may control the speed control module to adjust the distance to the surrounding vehicle becomes a predetermined maximum value when the driving lane is not changed for a second reference time from the time when the user is notified of the deflection direction of the surrounding vehicle.

At the present time, the second reference time may be greater than the first reference time, and when the second reference time is greater than the first reference time, the speed control module 141 may be controlled later than the steering control module 142.

Or, if it is not determined that the surrounding vehicles are deflected, the controller 130 may adjust the speed control module 141 so that the distance to the surrounding vehicles becomes a predetermined maximum value based on the position of the surrounding vehicles.

In the instant case, when the surrounding vehicle is a following vehicle and the driving information related to the following vehicle satisfies a predetermined condition, the controller 130 may control the steering control module 142 to change the driving lane or request a user to change the driving lane.

When the user requests to change the driving lane, if the driving lane is not changed for a third predetermined time from the time when the driving lane is requested to be changed, the controller 130 may adjust the speed control module 141 so that the distance to the surrounding vehicles becomes a predetermined maximum value.

As described above, the controller 130 may determine whether the driver of the surrounding vehicle is drowsiness state, and may avoid the surrounding vehicle in stages based on this, and thus the safety of driving may be greatly increased.

Meanwhile, the controller 130 performs the above-described operation using a memory that stores data about an algorithm or a program that processing the algorithm for controlling the operation of the components in the vehicle 100, and the data stored in the memory. It may be implemented by a processor. In the instant case, the memory and the processor may be implemented as separate chips. Alternatively, the memory and the processor may be implemented in a single chip.

At least one component may be added or deleted to correspond to the performance of the components of the vehicle 100 illustrated in FIG. 1. Furthermore, it will be readily understood by those skilled in the art that the mutual position of the components may be changed corresponding to the performance or structure of the system.

Meanwhile, each component illustrated in FIG. 1 refers to hardware components such as software and/or a field programmable gate array (FPGA) and an application specific integrated circuit (ASIC).

Figure 3:
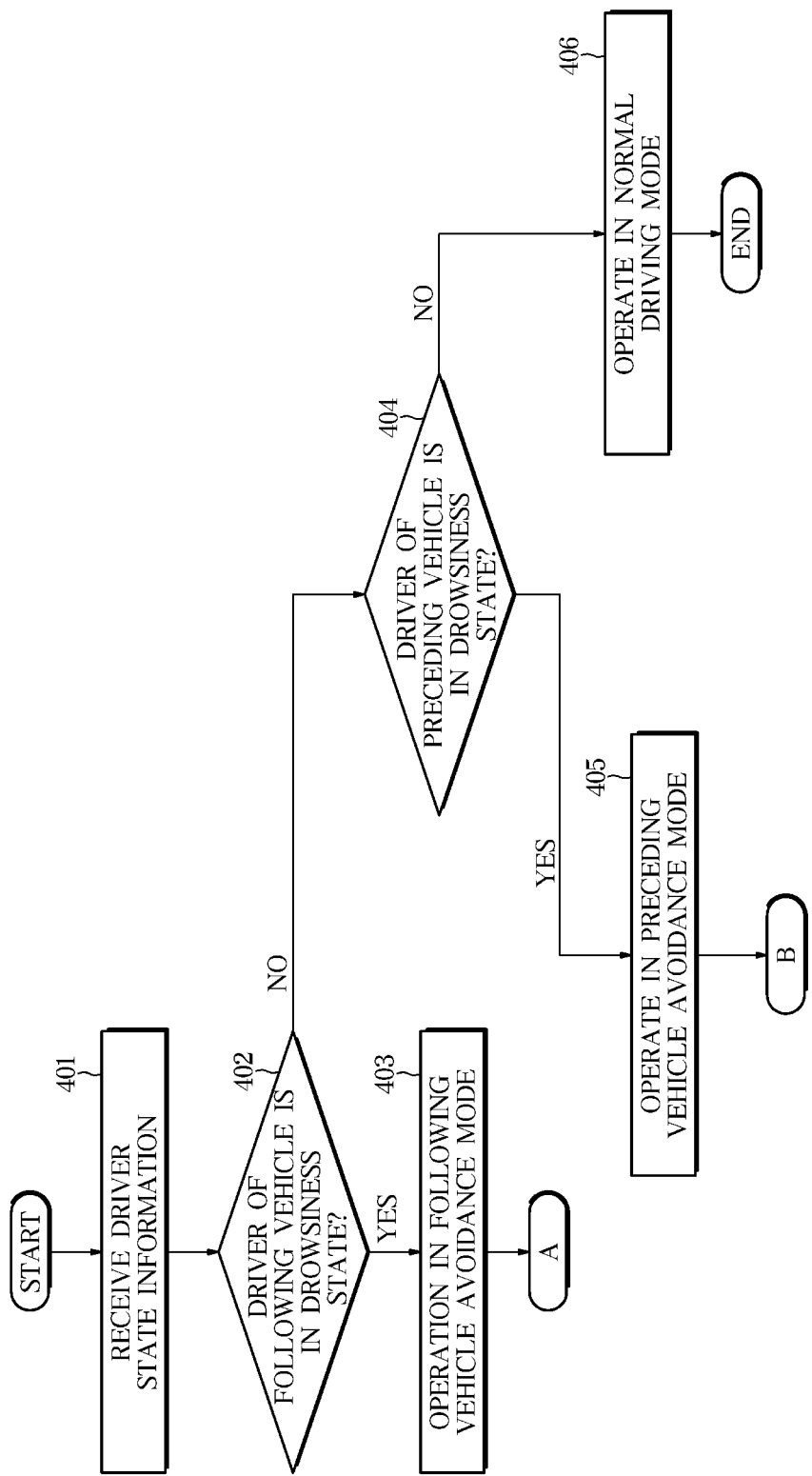
FIG. 3 is a flowchart of controlling method of a vehicle according to an exemplary embodiment of the present invention.

FIG. 3 is a flowchart of controlling method of a vehicle according to an exemplary embodiment of the present invention.

Referring to FIG. 3, the controller 130 of the vehicle 100 according to an exemplary embodiment of the present invention may receive driver state information (step 401), and determine whether a driver of a following vehicle is in a drowsiness state based on the received driver state information (step 402).

When the driver of the following vehicle is in the drowsiness state (YES in step 402), the controller 130 may operate in the following vehicle avoidance mode (step 403).

If the driver of the following vehicle is not in the drowsiness state (NO in step 402), the controller 130 may determine whether the driver of the preceding vehicle is in the drowsiness state (step 404), and if the driver of the preceding vehicle is in the drowsiness state (Yes of step 404), the controller 130 may operate in the preceding vehicle avoidance mode (step 405).

If the driver of the preceding vehicle is not in the drowsiness state (NO in step 404), the controller 130 may operate in normal driving mode (step 406), In the normal driving mode, the controller 130 may generate a control command for the configuration of the vehicle 100 according to a control command related to driving from a user, rather than the control of the driving assistance module 140.

Figure 4:
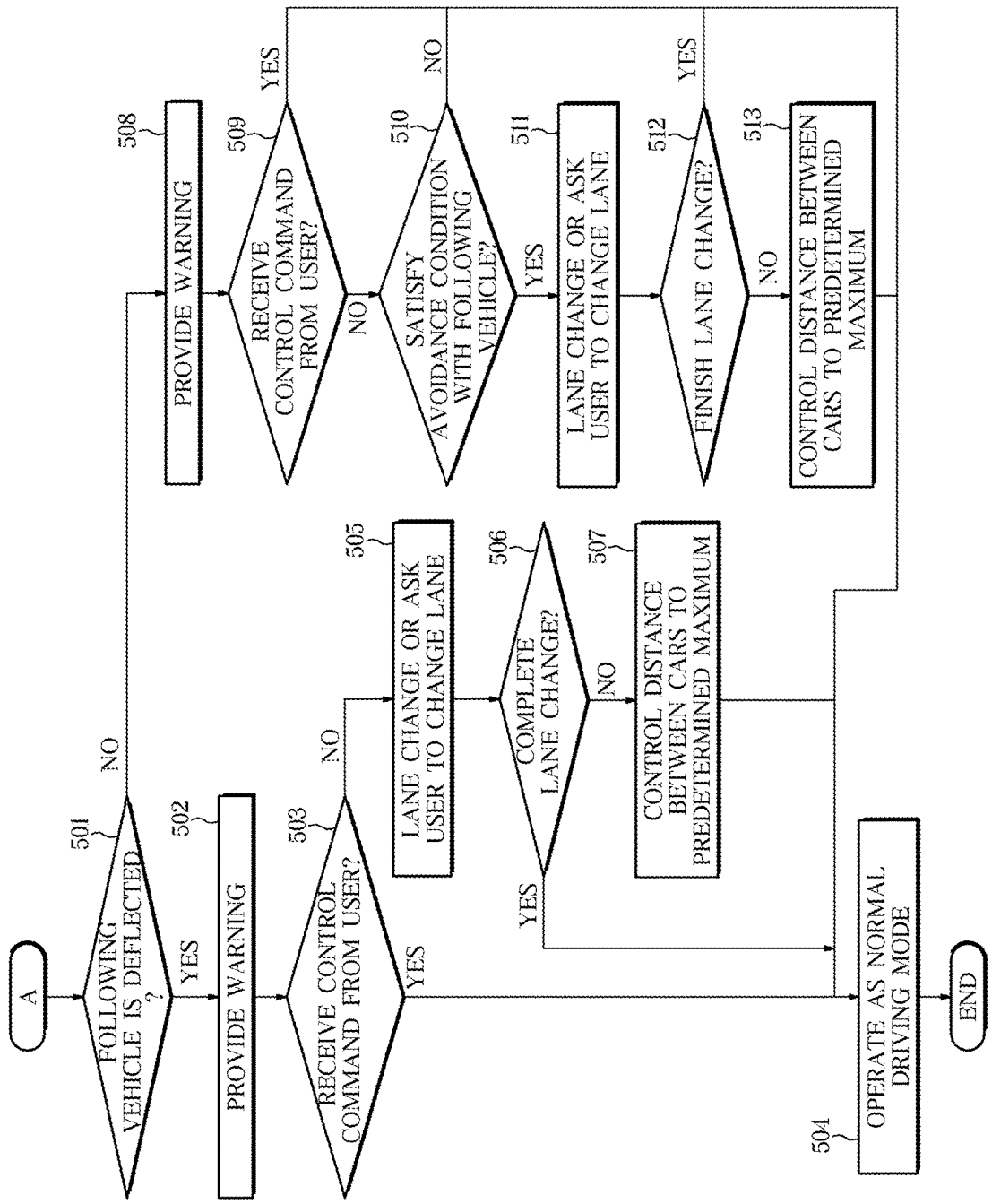
FIG. 4 is a flowchart of controlling method of a vehicle in avoidance mode of following vehicle according to an exemplary embodiment of the present invention.

FIG. 4 is a flowchart of controlling method of a vehicle in avoidance mode of following vehicle according to an exemplary embodiment of the present invention.

Referring to FIG. 4, the controller 130 of the vehicle 100 according to an exemplary embodiment of the present invention may determine whether the following vehicle is deflected (step 501). Controller 130 may determine the deflection of the following vehicle based on at least one of the speed information related to the vehicle 100 included in the driving information related to the following vehicle, the speed information related to the following vehicle, the distance information, or the lane information.

If it is determined that the following vehicle is deflected (Yes of step 501), the user may be warned that the following vehicle is deflected (step 502). In the instant case, the controller 130 may notify the driver of the following vehicle is in the drowsiness state with the deflection direction of the following vehicle.

The controller 130 may check whether a control command related to driving of the vehicle is received from the user within a predetermined time from the time when the deflection of the following vehicle is warned (step 503). In the instant case, a control command related to driving of the vehicle may be received by operating a steering wheel or pressing a brake pedal.

When a control command related to driving of the vehicle is received from the user (YES of step 503), the controller 130 may operate in a normal driving mode (step 504).

As an exemplary embodiment of the present invention, if a control command related to driving of the vehicle is not received from the user (NO in step 503), the controller 130 may change the lane to a lane opposite to the deflection direction of the following vehicle or may request the user to change the lane (step 505).

In detail, when the deflection direction of the following vehicle is the left side, the controller 130 may request the user to change the lane to the right lane or change the lane to the right lane. Alternatively, when the deflection direction of the following vehicle is the right side, the controller 130 may request the user to change the lane to the left lane or change the lane to the left lane.

Furthermore, the controller 130 may check whether the lane change is completed for a predetermined time (step 506), and when the lane change is completed (YES in step 506), the controller 130 may operate in the normal driving mode (step 504).

Alternatively, when the lane change is not completed (NO in 506), the controller 130 may control the speed control module 141 such that the distance between the vehicle 100 and the following vehicle reaches a predetermined maximum value (step 507).

As an exemplary embodiment of the present invention, when it is determined that the following vehicle is not deflected (NO in step 501), the controller 130 may warn the user that the driver of the following vehicle is in a drowsiness state (step 508). In the instant case, the controller 130 may notify the location information related to the following vehicle together.

The controller 130 may check whether a control command related to driving of the vehicle may be received from the user received in a predetermined time from the time when the controller 130 warns the driver of the following vehicle is in the drowsiness state (509).

When a control command related to driving of the vehicle is received from the user (Yes of step 509), the controller 130 may operate in a normal driving mode (step 504).

Alternatively, if a control command related to driving of the vehicle is not received from the user (NO in step 509), the controller 130 may determine whether the predetermined following vehicle avoidance condition is satisfied based on driving information related to the following vehicle (step 510). In detail, the controller 130 may determine whether to satisfy a predetermined following vehicle avoidance condition based on at least one of the inter-vehicle distance between the following vehicle and the vehicle 100 or the speed difference between the following vehicle and the vehicle 100.

If the following vehicle avoidance condition is satisfied (Yes of step 510), the controller 130 may change the lane to the right or left lane or may request the user to change the lane (step 511).

Thereafter, the controller 130 may check whether the lane change is completed for a predetermined time (step 512), and when the lane change is completed (Yes of step 512), the controller 130 may operate in a normal driving mode (step 504).

Alternatively, when the lane change is not completed (NO in step 512), the controller 130 may control the speed control module 141 such that the distance between the vehicle 100 and the following vehicle reaches a predetermined maximum value (step 513).

As a result, the vehicle 100 may avoid the surrounding vehicles in stages based on the drowsiness state of the driver of the surrounding vehicle, so that the driving safety may be greatly increased.

Figure 5:
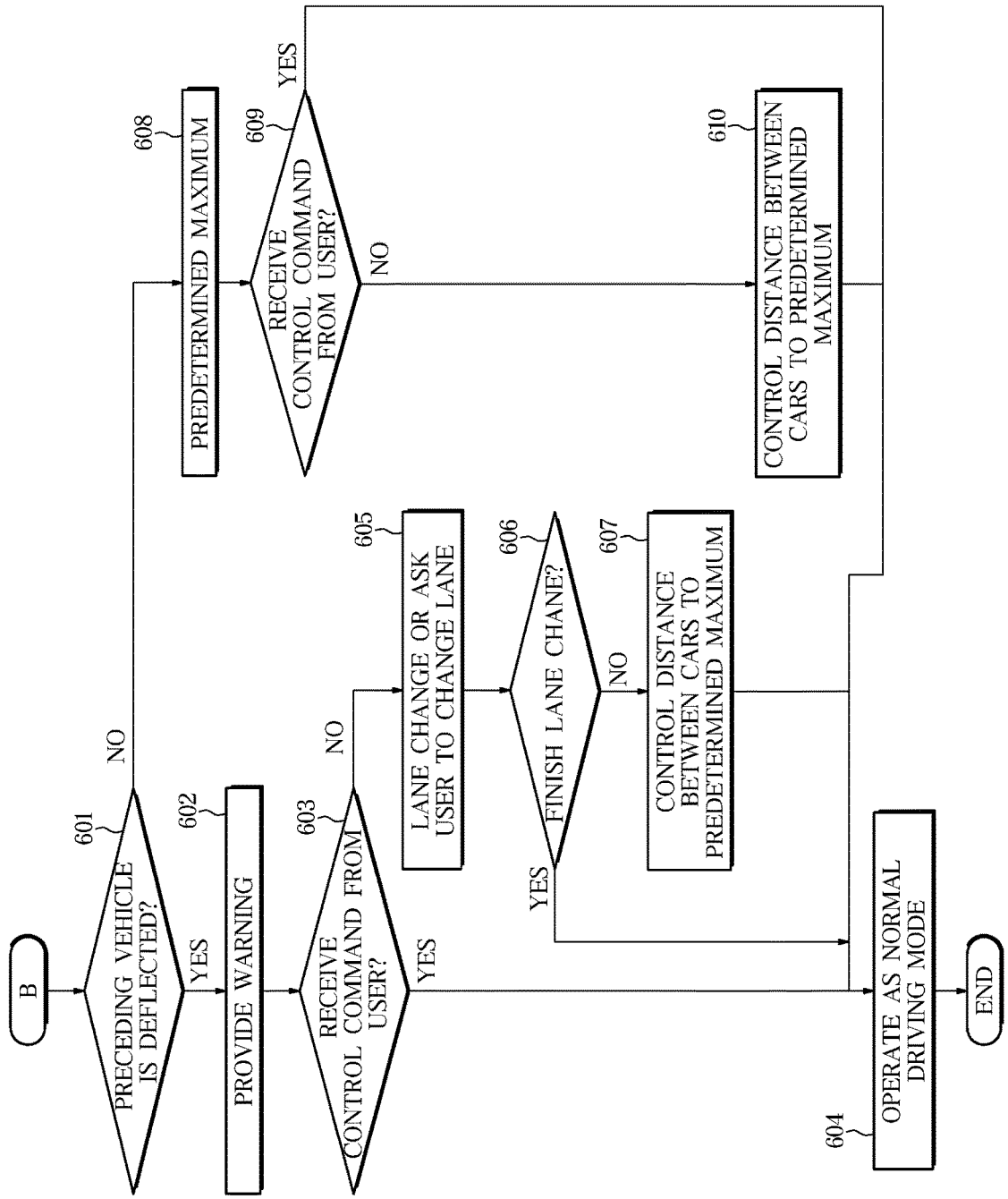
FIG. 5 is a flowchart of controlling method of a vehicle in avoidance mode of preceding vehicle according to an exemplary embodiment of the present invention.

FIG. 5 is a flowchart of controlling method of a vehicle in avoidance mode of preceding vehicle according to an exemplary embodiment of the present invention.

Referring to FIG. 5, each of the steps 601 to 609 in the preceding vehicle avoidance mode performed by the controller 130 of the vehicle 100 according to an exemplary embodiment of the present invention may be applied in the same manner in the following vehicle avoidance mode in FIG. 4, and therefore, the description is omitted.

Unlike in the following vehicle avoidance mode, if a control command related to the driving of the vehicle is not received from the user (No of step 609), the controller 130 controls the speed control module 141 to immediately controls the distance between the vehicle 100 and the following vehicle to a predetermined maximum value (step 610).

This is because the drowsiness driving of the driver of the following vehicle may have a greater impact on driving safety than the drowsiness of the driver of the preceding vehicle, and thus, the lane change is attempted first. When the driver of the following vehicle is in the drowsiness state, the controller 130 attempts to change lanes first to substantially increasing driving safety.

As described above, the disclosed exemplary embodiments have been described with reference to the accompanying drawings. Those skilled in the art will understand that the present invention may be implemented in a form different from the disclosed exemplary embodiments without changing the technical spirit or essential features of the present invention. The disclosed exemplary embodiments are exemplary and should not be construed as limiting.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although example embodiments of the present invention have been shown and described, it would be appreciated by those skilled in the art that changes may be made to these embodiments without departing from the principles and spirit of the present invention, the scope of which is defined in the claims and their equivalents.

According to the vehicle and the control method thereof according to an aspect, since the surrounding vehicle may be avoided step by step based on whether the driver of the surrounding vehicle is in drowsiness state, the safety of driving may be greatly increased.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
a communicator configured to receive driver state information from a surrounding vehicle;
a detector configured to obtain driving information related to the surrounding vehicle;
a driving assistance module configured to control at least one of a driving speed or a driving direction of the vehicle; and
a controller connected to the communicator, the detector and the driving assistance module and configured to determine whether a driver of the surrounding vehicle is in drowsiness state based on when the received driver state information satisfies a predetermined condition and control the driving assistance module to avoid the surrounding vehicle when the driver of the surrounding vehicle is determined to be in the drowsiness state,
wherein the controller is configured to inform a user of a deflection direction of the surrounding vehicle, and
wherein the controller is configured to control the driving assistance module such that the driving direction is opposite to the deflection direction of the surrounding vehicle when a control command related to driving of the vehicle is not received from the user for a predetermined first reference time from a time when the user is informed of the deflection direction of the surrounding vehicle.

2. The vehicle according to claim 1,
wherein the controller is configured to determine that the driver of the surrounding vehicle is in the drowsiness state upon determining that the driver state information is continuously received for more than a predetermined time or received for more than a predetermined number of times for a predetermined unit time.

3. The vehicle according to claim 1,
wherein the controller is configured to determine whether the surrounding vehicle is deflected based on the driving information related to the surrounding vehicle when the driver of the surrounding vehicle is determined to be in the drowsiness state, and is configured to control the driving assistance module to avoid the surrounding vehicle based on a deflection of the surrounding vehicle.

4. The vehicle according to claim 3,
wherein the controller is configured to determine the deflection of the surrounding vehicle based on at least one of speed information related to the vehicle, speed information, distance information, and lane information related to the surrounding vehicle included in the driving information related to the surrounding vehicle.

5. The vehicle according to claim 3,
wherein the controller is configured to control the driving assistance module such that the driving direction is opposite to the deflection direction of the surrounding vehicle when the surrounding vehicle is determined to be deflected.

6. The vehicle according to claim 5, further including:
a display; and
a speaker; and
wherein the controller connected to at least one of the display and the speaker is configured to control the display or the speaker to inform the user of the deflection direction of the surrounding vehicle.

7. The vehicle according to claim 6,
wherein the controller is configured to control the driving assistance module such that a distance from the surrounding vehicle to the vehicle becomes a predetermined maximum value when a driving lane of the vehicle is not changed for a predetermined second reference time from a time when the user is informed of the deflection direction of the surrounding vehicle.

8. The vehicle according to claim 3,
wherein the controller is configured to control the driving assistance module such that a distance from the surrounding vehicle to the vehicle becomes a predetermined maximum value based on a position of the surrounding vehicle when the surrounding vehicle is determined as being not deflected.

9. The vehicle according to claim 8,
wherein the controller is configured to control the driving assistance module to change a driving lane of the vehicle or requests the user to change the driving lane upon determining that the surrounding vehicle is a following vehicle and driving information related to the following vehicle satisfies a predetermined condition.

10. The vehicle according to claim 9,
wherein the controller is configured to control the driving assistance module such that the distance from the surrounding vehicle to the vehicle becomes the predetermined maximum value upon determining that the driving lane is not changed for a predetermined third reference time from a time that is requested to change the driving lane.

11. The vehicle according to claim 1, further including:
a display; and
a speaker; and
wherein the controller connected to at least one of the display and the speaker is configured to control the display or the speaker to output alarm when the driver of the surrounding vehicle is determined to be in the drowsiness state.

12. The vehicle according to claim 1,
wherein the controller is configured to control the driving assistance module to avoid a following vehicle when a driver of a preceding vehicle and a driver of the following vehicle are determined to be in the drowsiness state.

13. A method of controlling a vehicle, the method comprising:
receiving, by a controller, driver state information from a surrounding vehicle;
obtaining, by the controller, driving information related to the surrounding vehicle;
determining, by the controller, whether a driver of the surrounding vehicle is in a drowsiness state based on whether the received driver state information satisfies a predetermined condition; and
controlling, by the controller, at least one of driving speed and driving direction of the vehicle to avoid the surrounding vehicle when the driver of the surrounding vehicle is determined to be in the drowsiness state, wherein the controlling at least one of driving speed and driving direction of the vehicle to avoid the surrounding vehicle further includes:

informing a deflection direction of the surrounding vehicle; and controlling the driving direction such that the driving direction is opposite to the deflection direction of the surrounding vehicle when a control command related to driving of the vehicle is not received from a user for a predetermined first reference time from a time when the user is informed of the deflection direction of the surrounding vehicle.

14. The method according to claim 13, wherein the controlling at least one of driving speed and driving direction of the vehicle to avoid the surrounding vehicle includes:

determining whether the surrounding vehicle is deflected based on the driving information related to the surrounding vehicle when the driver of the surrounding vehicle is determined to be in the drowsiness state, and controlling at least one of the driving speed and the driving direction of the vehicle to avoid the surrounding vehicle based on a deflection of the surrounding vehicle.

15. The method according to claim 14, wherein the controlling at least one of driving speed and driving direction of the vehicle to avoid the surrounding vehicle further includes:

controlling the driving direction such that the driving direction is opposite to the deflection direction of the surrounding vehicle when the surrounding vehicle is determined to be deflected.

16. The method according to claim 15, wherein the controlling at least one of driving speed and driving direction of the vehicle to avoid the surrounding vehicle further includes:

controlling the driving assistance module such that a distance from the surrounding vehicle to the vehicle becomes a predetermined maximum value when a driving lane of the vehicle is not changed for a predetermined second reference time from a time when the user is informed of the deflection direction of the surrounding vehicle.

17. The method according to claim 14, wherein the controlling at least one of driving speed and driving direction of the vehicle to avoid the surrounding vehicle further includes:

controlling the driving speed such that a distance from the surrounding vehicle to the vehicle becomes a predetermined maximum value based on a position of the surrounding vehicle when the surrounding vehicle is determined as being not deflected.

18. A non-transitory computer-readable storage medium having stored therein an information processing program to be executed by a computer, the program configured to cause the computer to execute operations comprising:

receiving driver state information from a surrounding vehicle;

obtaining driving information related to the surrounding vehicle;

determining when a driver of the surrounding vehicle is in a drowsiness state based on when the received driver state information satisfies a predetermined condition; and controlling at least one of driving speed and driving direction of a vehicle to avoid the surrounding vehicle when the driver of the surrounding vehicle is determined to be in the drowsiness state, wherein the controlling at least one of driving speed and driving direction of the vehicle to avoid the surrounding vehicle further includes:

informing a deflection direction of the surrounding vehicle; and controlling the driving direction such that the driving direction is opposite to the deflection direction of the surrounding vehicle when a control command related to driving of the vehicle is not received from a user for a predetermined first reference time from a time when the user is informed of the deflection direction of the surrounding vehicle.

\* \* \* \* \*

UNITED STATES PATENT AND TRADEMARK OFFICE
CERTIFICATE OF CORRECTION

PATENT NO. : 11,318,933 B2
APPLICATION NO. : 16/667705
DATED : May 3, 2022
INVENTOR(S) : Hong Gi Park et al.

It is certified that error appears in the above-identified patent and that said Letters Patent is hereby corrected as shown below:

On the Title Page

In item (73) the Assignee, please correct the following:
From: Hyundai Motor Gorporation To: Hyundai Motor Corporation
From: Kia Motors Gorporation To: Kia Motors Corporation Signed and Sealed this
Twenty-first Day of February, 2023

Katherine Kelly Vidal
*Director of the United States Patent and Trademark Office*